(12) United States Patent
Lee et al.

(10) Patent No.: US 11,328,867 B2
(45) Date of Patent: May 10, 2022

(54) MULTILAYER CAPACITOR

(71) Applicant: SAMSUNG ELECTRO-MECHANICS CO., LTD., Suwon-si (KR)

(72) Inventors: Sang Jong Lee, Suwon-si (KR); Su Bong Jang, Suwon-si (KR); Hee Soo Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 57 days.

(21) Appl. No.: 16/846,786

(22) Filed: Apr. 13, 2020

(65) Prior Publication Data

US 2021/0183569 A1   Jun. 17, 2021

(30) Foreign Application Priority Data

Dec. 13, 2019   (KR) .......................... 10-2019-0167024

(51) Int. Cl.
| | |
|---|---|
| *H01G 4/012* | (2006.01) |
| *H01G 4/248* | (2006.01) |
| *H01G 4/30* | (2006.01) |
| *H01G 4/12* | (2006.01) |

(52) U.S. Cl.
CPC ............ *H01G 4/012* (2013.01); *H01G 4/248* (2013.01); *H01G 4/30* (2013.01); *H01G 4/1227* (2013.01)

(58) Field of Classification Search
CPC ........... H01G 4/12; H01G 2/065; H01G 2/24; H01G 4/0085; H01G 4/012; H01G 4/20; H01G 4/2325; H01G 4/30; H01G 4/306; H01G 4/33; H01G 4/065; H01G 4/1218
See application file for complete search history.

(56) References Cited

U.S. PATENT DOCUMENTS

| | | | | |
|---|---|---|---|---|
| 2010/0039749 A1* | 2/2010 | Ritter | ..................... | H01G 4/005 361/301.4 |
| 2015/0014035 A1* | 1/2015 | Park | ...................... | H01G 4/012 174/260 |
| 2016/0196921 A1* | 7/2016 | Oh | ........................... | H01G 4/30 174/260 |
| 2019/0080843 A1* | 3/2019 | Jang | ....................... | H01G 4/232 |

FOREIGN PATENT DOCUMENTS

| | | |
|---|---|---|
| KR | 10-2009-0117686 A | 11/2009 |
| KR | 10-2015-0121479 A | 10/2015 |

\* cited by examiner

*Primary Examiner* — Michael P McFadden
(74) *Attorney, Agent, or Firm* — Morgan, Lewis & Bockius LLP

(57) ABSTRACT

A multilayer capacitor includes a capacitor body including first and second dielectric layers, a plurality of internal electrodes, and a plurality of second internal electrodes, and first and second external electrodes. First and second internal electrodes are disposed in one of the first dielectric layers to be spaced apart from each other. The first and second internal electrodes are disposed in one of the second dielectric layers to be spaced apart from each other. The first and second dielectric layers are alternately laminated in the first direction, such that the first internal electrode of the first dielectric layer and the second internal electrode of the second dielectric layer overlap each other in the first direction and the second internal electrode of the first dielectric layer and the first internal electrode of the second dielectric layer overlap each other in the first direction.

21 Claims, 13 Drawing Sheets

MULTILAYER CAPACITOR

CROSS-REFERENCE TO RELATED APPLICATION(S)

This application claims the benefit under 35 USC 119(a) of Korean Patent Application No. 10-2019-0167024 filed on Dec. 13, 2019 in the Korean Intellectual Property Office, the entire disclosure of which is incorporated herein by reference for all purposes.

TECHNICAL FIELD

The present disclosure relates to a multilayer capacitor.

BACKGROUND

Recently, as smartphones have become thinner, lightness, high integration, and thinning of electronic components are rapidly progressing. In addition, the number of passive elements, applied to an electronic component, is greater than the number of active elements applied thereto.

Among such passive elements, multilayer capacitors have been in the spotlight, because the number of multilayer capacitors is greater than the number of other passive elements on a circuit and the importance of the multilayer capacitors is increasing in electric circuits due to a requirement for decoupling capacitors, having high capacitance and a short connection length, with advances in microelectronics.

In addition, such multilayer capacitors are required to have low equivalent series resistance (ESR) to achieve high efficiency while retaining the same capacitance and low equivalent series inductance (ESL) to significantly reduce ripples in a power supply current.

SUMMARY

An aspect of the present disclosure is to provide a multilayer capacitor having low ESR and low ESL.

According to an aspect of the present disclosure, a multilayer capacitor includes a capacitor body including first and second dielectric layers having first and second surfaces opposing each other, third and fourth surfaces connected to the first and second surfaces and opposing each other, and fifth and sixth surfaces connected to the first and second surfaces as well as to the third and fourth surfaces and opposing each other, the first and second dielectric layers being alternately laminated in a first direction, a plurality of internal electrodes exposed through the third surface, and a plurality of second internal electrodes through the fourth surface, and first and second external electrodes, respectively disposed on the third and fourth surfaces of the capacitor body. First and second internal electrodes are disposed in one of the first dielectric layers to be spaced apart from each other. The first and second internal electrodes are disposed in one of the second dielectric layers to be spaced apart from each other. The first and second dielectric layers are alternately laminated in the first direction, such that the first internal electrode of the first dielectric layer and the second internal electrode of the second dielectric layer overlap each other in the first direction and the second internal electrode of the first dielectric layer and the first internal electrode of the second dielectric layer overlap each other in the first direction.

The first internal electrode may include a 1-1-th internal electrode, disposed in the first dielectric layer to be exposed toward the third surface of the capacitor body, and a 1-2-th internal electrode disposed in the second internal electrode to be exposed toward the third surface of the capacitor body and to not overlap the 1-1-th internal electrode in the first direction. The second internal electrode may include a 2-1-th internal electrode, disposed in the first dielectric layer to be spaced apart from the 1-1-th internal electrode in a second direction and to be exposed toward the fourth surface of the capacitor body, and a 2-2-th internal electrode disposed in the second dielectric layer to be spaced apart from the 1-2-th internal electrode in the second direction in which the fifth and sixth surface are connected to each other, to be exposed toward the fourth surface of the capacitor body, and to not overlap the 2-1-th internal electrode in the first direction.

The first internal electrode may include a first capacitance formation portion and a first lead portion extending from the first capacitance formation portion to be exposed through the third surface of the capacitor body and formed to be wider than the first capacitance formation portion in the second direction. The second internal electrode may include a second capacitance formation portion, overlapping the first capacitance formation portion in the first direction, and a second lead portion extending from the second capacitance formation portion to be exposed through the fourth surface of the capacitor body and formed to be wider than the second capacitance formation portion in the second direction.

The first internal electrode may include a 1-1-th internal electrode, disposed in the first dielectric layer to be exposed toward the third surface of the capacitor body, and a plurality of 1-2-th internal electrodes disposed in the second internal to be exposed toward the third surface of the capacitor body and to not overlap the 1-1-th internal electrode in the first direction. The second internal electrode may include a plurality of 2-1-th internal electrodes, disposed in the first dielectric layer to be spaced apart from the 1-1-th internal electrode in a second direction and to be exposed toward the fourth surface of the capacitor body, and a 2-2-th internal electrode disposed in the second dielectric layer to be exposed toward the fourth surface of the second dielectric layer and to not overlap the 2-1-th internal electrode in the first direction.

The 1-1-th internal electrode may include a 1-1-th capacitance formation portion and a 1-1-th lead portion extending from the 1-1-th capacitance formation portion to be exposed through the third surface of the capacitor body and formed to be wider than the 1-1-th capacitance formation portion in the second direction. The 1-2-th internal electrode may include a plurality of 1-2-th capacitance formation portions and a 1-2-th lead portion connecting end portions of the plurality of 2-1-th capacitance formation portions to each other and exposed through the third surface of the capacitor body. The 2-1-th internal electrode may include a plurality of 2-1-th capacitance formation portions, overlapping the plurality of 1-2-th capacitance formation portions in the first direction, and a 2-1th lead portion connecting end portions of the plurality of 2-1-th capacitance formation portions to each other and exposed through the fourth surface of the capacitor body. The 2-2-th internal electrode may include a 2-2-th capacitance formation portion, overlapping the 1-1-th capacitance formation portion in the first direction, and a 2-2-th lead portion extending from the 2-2-th capacitance formation portion to be exposed through the fourth surface of the capacitor body and formed to be wider than the 2-2-th capacitance formation portion in the second direction.

The first internal electrode may include a plurality of 1-1-th internal electrodes, disposed in the first dielectric layer to be exposed toward the third surface of the capacitor body, and a plurality of 1-2-th internal electrodes disposed in the second dielectric layer to be exposed toward the third surface of the capacitor body and to not overlap the plurality of 1-1-th internal electrodes in the first direction. The second internal electrode may include a plurality of 2-1-th internal electrodes, disposed in the first dielectric layer to be spaced apart from the 1-1-th internal electrode in a second direction and to be exposed toward the fourth surface of the capacitor body, and a plurality of 2-2-th internal electrodes disposed in the second dielectric layer to be exposed toward the fourth surface of the capacitor body and to not overlap the plurality of 2-1-th internal electrodes in the first direction.

The 1-1-th internal electrode may include a plurality of 1-1-th capacitance formation portions and a plurality of 1-1-th lead portions connecting end portions of the plurality of 1-1-th capacitance formation portions to each other and exposed through the third surface of the capacitor body. The 1-2-th internal electrode may include a plurality of 1-2-th capacitance formation portions and a 1-2-th lead portion connecting end portions of the plurality of 2-1-th capacitance formation portions to each other and exposed through the third surface of the capacitor body. The 2-1-th internal electrode may include a plurality of 2-1-th capacitance formation portions, overlapping the plurality of 1-2-th capacitance formation portions in the first direction, and a 2-1-th lead portion connecting end portions of the plurality of 2-1-th capacitance formation portions to each other and exposed through the fourth surface of the capacitor body. The 2-2-th internal electrode may include a plurality of 2-2-th capacitance formation portions, overlapping the plurality of 1-1-th capacitance formation portions in the first direction, and a 2-2-th lead portion exposed through the fourth surface of the capacitor body.

According to an aspect of the present disclosure, a multilayer capacitor includes a capacitor body including first and second dielectric layers having first and second surfaces opposing each other, third and fourth surfaces connected to the first and second surfaces and opposing each other, and fifth and sixth surfaces connected to the first and second surfaces as well as to the third and fourth surfaces and opposing each other, the first and second dielectric layers being alternately laminated in a second direction, a plurality of internal electrodes exposed through the third surface, and a plurality of second internal electrodes through the fourth surface, and first and second external electrodes, respectively disposed on the third and fourth surfaces of the capacitor body. First and second internal electrodes are disposed in one of the first dielectric layer to be spaced apart from each other, and the first and second internal electrodes are disposed in one of the second dielectric layers to be spaced apart from each other. The first and second dielectric layers are alternately laminated in the second direction such that the first internal electrode of the first dielectric layer and the second internal electrode of the second dielectric layer overlap each other in the second direction and the second internal electrode of the first dielectric layer and the first internal electrode of the second dielectric layer overlap each other in the second direction.

The first internal electrode may include a 1-1-th internal electrode, disposed in the first dielectric layer to be exposed toward the third surface of the capacitor body, and a 1-2-th internal electrode disposed in the second internal electrode to be exposed toward the third surface of the capacitor body and to not overlap the 1-1-th internal electrode in the second direction. The second internal electrode may include a 2-1-th internal electrode, disposed in the first dielectric layer to be spaced apart from the 1-1-th internal electrode in a first direction and to be exposed toward the fourth surface of the capacitor body, and a 2-2-th internal electrode disposed in the second dielectric layer to be spaced apart from the 1-2-th internal electrode in the first direction, to be exposed toward the fourth surface of the capacitor body, and to not overlap the 2-1-th internal electrode in the second direction.

The first internal electrode may include a first capacitance formation portion and a first lead portion extending from the first capacitance formation portion to be exposed through the third surface of the capacitor body and formed to be wider than the first capacitance formation portion in the first direction. The second internal electrode may include a second capacitance formation portion, overlapping the first capacitance formation portion in the second direction, and a second lead portion extending from the second capacitance formation portion to be exposed through the fourth surface of the capacitor body and formed to be wider than the second capacitance formation portion in the first direction.

The first internal electrode may include a 1-1-th internal electrode, disposed in the first dielectric layer to be exposed toward the third surface of the capacitor body, and a plurality of 1-2-th internal electrodes disposed in the second internal to be exposed toward the third surface of the capacitor body and to not overlap the 1-1-th internal electrode in the second direction. The second internal electrode may include a plurality of 2-1-th internal electrodes, disposed in the first dielectric layer to be spaced apart from the 1-1-th internal electrode in the second direction and to be exposed toward the fourth surface of the capacitor body, and a 2-2-th internal electrode disposed in the second dielectric layer to be exposed toward the fourth surface of the second dielectric layer and to not overlap the 2-1-th internal electrode in the second direction.

The 1-1-th internal electrode may include a 1-1-th capacitance formation portion and a 1-1-th lead portion extending from the 1-1-th capacitance formation portion to be exposed through the third surface of the capacitor body and formed to be wider than the 1-1-th capacitance formation portion in the first direction. The 1-2-th internal electrode may include a plurality of 1-2-th capacitance formation portions and a 1-2-th lead portion connecting end portions of the plurality of 2-1-th capacitance formation portions to each other and exposed through the third surface of the capacitor body. The 2-1-th internal electrode may include a plurality of 2-1-th capacitance formation portions, overlapping the plurality of 1-2-th capacitance formation portions in the second direction, and a 2-1-th lead portion connecting end portions of the plurality of 2-1-th capacitance formation portions to each other and exposed through the fourth surface of the capacitor body. The 2-2-th internal electrode may include a 2-2-th capacitance formation portion, overlapping the 1-1-th capacitance formation portion in the second direction, and a 2-2-th lead portion extending from the 2-2-th capacitance formation portion to be exposed through the fourth surface of the capacitor body and formed to be wider than the 2-2-th capacitance formation portion in the first direction.

The first internal electrode may include a plurality of 1-1-th internal electrodes, disposed in the first dielectric layer to be exposed toward the third surface of the capacitor body, and a plurality of 1-2-th internal electrodes disposed in the second dielectric layer to be exposed toward the third surface of the capacitor body and to not overlap the plurality of 1-1-th internal electrodes in the second direction. The second internal electrode may include a plurality of 2-1-th internal electrodes, disposed in the first dielectric layer to be spaced apart from the 1-1-th internal electrode in a first direction and to be exposed toward the fourth surface of the capacitor body, and a plurality of 2-2-th internal electrodes disposed in the second dielectric layer to be exposed toward the fourth surface of the capacitor body and to not overlap the plurality of 2-1-th internal electrodes in the second direction.

The 1-1-th internal electrode may include a plurality of 1-1-th capacitance formation portions and a plurality of 1-1-th lead portions connecting end portions of the plurality of 1-1-th capacitance formation portions to each other and exposed through the third surface of the capacitor body. The 1-2-th internal electrode may include a plurality of 1-2-th capacitance formation portions and a 1-2-th lead portion connecting end portions of the plurality of 2-1-th capacitance formation portions to each other and exposed through the third surface of the capacitor body. The 2-1-th internal electrode may include a plurality of 2-1-th capacitance formation portions, overlapping the plurality of 1-2-th capacitance formation portions in the second direction, and a 2-1-th lead portion connecting end portions of the plurality of 2-1-th capacitance formation portions to each other and exposed through the fourth surface of the capacitor body. The 2-2-th internal electrode may includes a plurality of 2-2-th capacitance formation portions, overlapping the plurality of 1-1-th capacitance formation portions in the first direction, and a 2-2-th lead portion exposed through the fourth surface of the capacitor body.

The first external electrode may include a first connection portion, formed on the third surface of the capacitor body, and a first band portion extending from the first connection portion to a portion of each of the first, second, fifth, and sixth surfaces of the capacitor body. The second external electrode may include a second connection portion, formed on the fourth surface of the capacitor body, and a second band portion extending from the second connection portion to a portion of each of the first, second, fifth, and sixth surfaces of the capacitor body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
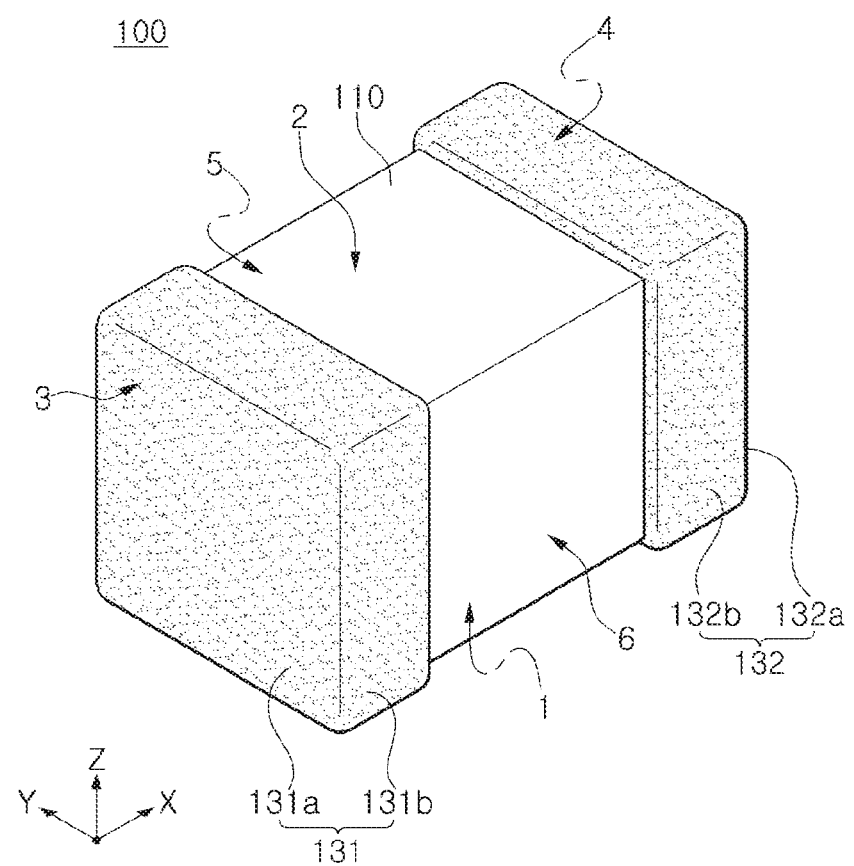
FIG. 1 is a schematic perspective view of a multilayer capacitor according to an embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of elements in the drawings may be exaggerated for clarity of description, and elements indicated by the same reference numeral are same elements in the drawings.

Further, throughout the specification, it will be understood that when a portion "includes" an element, it can further include another element, thereby not excluding the other element, unless otherwise indicated.

In the drawings, an X direction, a Y direction, and a Z direction indicate a length direction, a width direction, and a thickness direction of a multilayer capacitor 110, respectively.

Figure 2A:
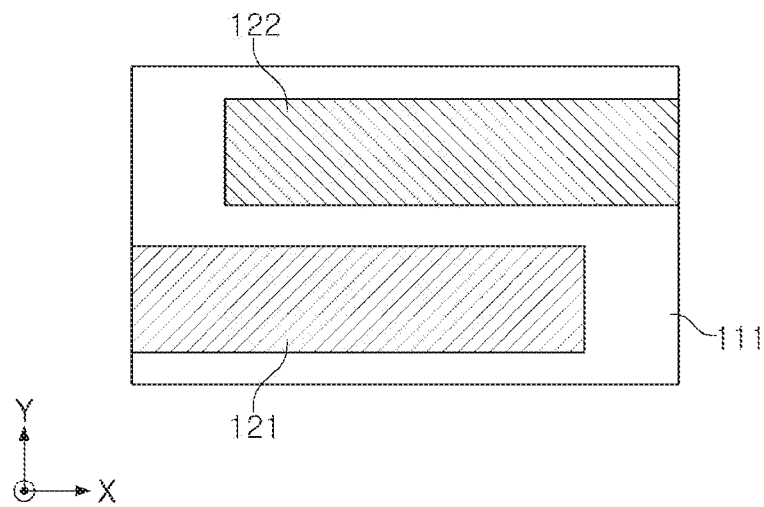
FIGS. 2A and 2B are plan views illustrating first and second dielectric layers and first and second internal electrodes of the multilayer capacitor in FIG. 1.
Figure 2B:
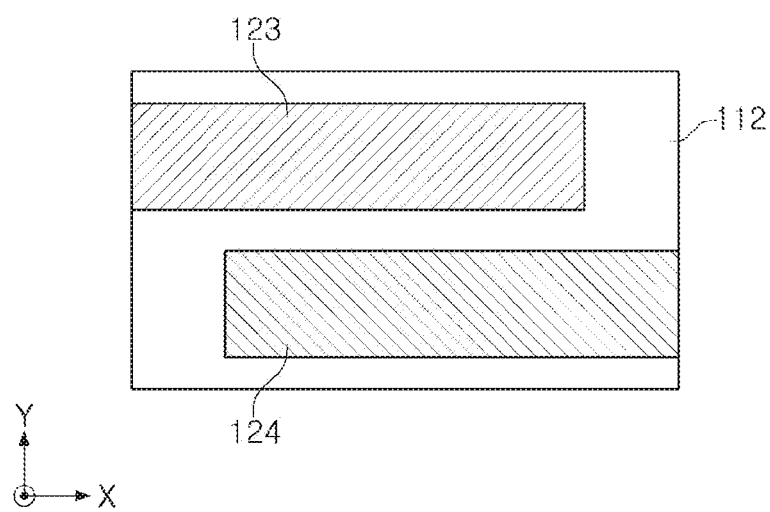
Figure 3:
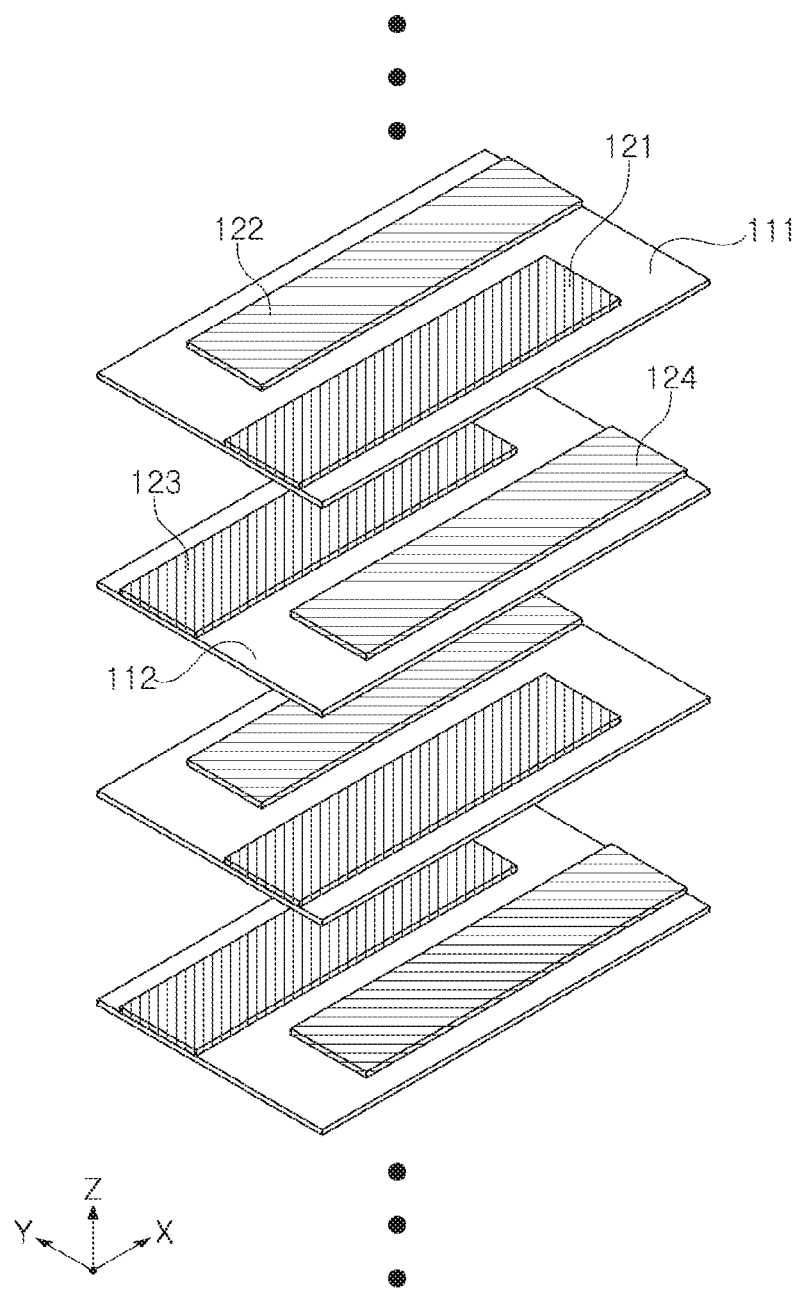
FIG. 3 is an exploded perspective view illustrating a structure in which the first and second dielectric layers of the multilayer capacitor in FIG. 1 are laminated.
Figure 4:
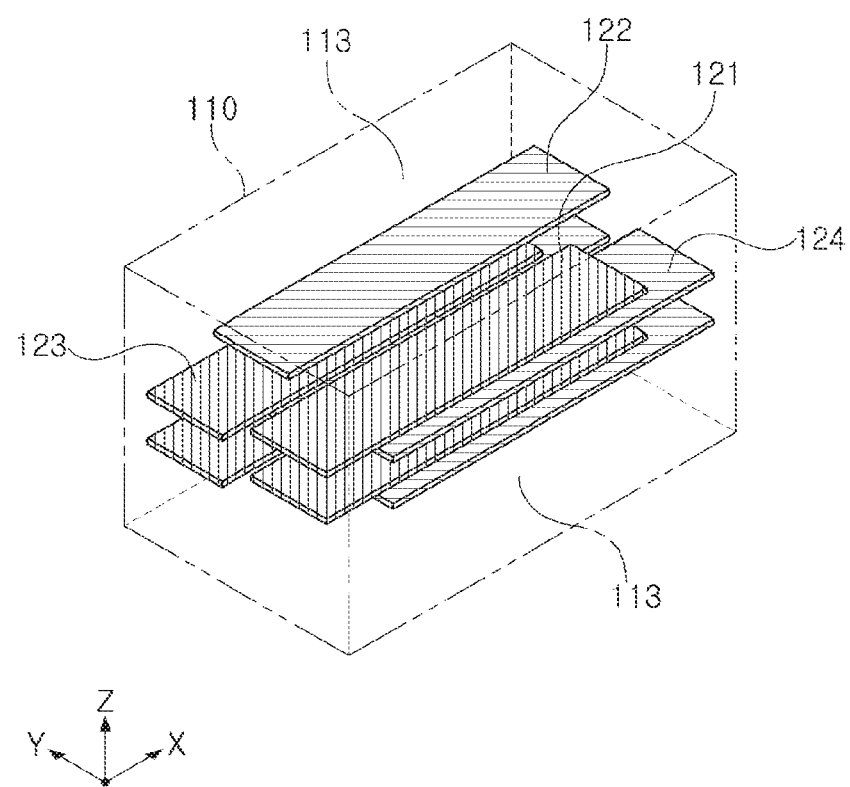
FIG. 4 is a transparent perspective view illustrating a structure in which the first and second dielectric layers of the multilayer capacitor in FIG. 1 are laminated.

FIG. 1 is a schematic perspective view of a multilayer capacitor according to an embodiment. FIGS. 2A and 2B are plan views illustrating first and second dielectric layers and first and second internal electrodes of the multilayer capacitor in FIG. 1. FIG. 3 is an exploded perspective view illustrating a structure in which the first and second dielectric layers of the multilayer capacitor in FIG. 1 are laminated. FIG. 4 is a transparent perspective view illustrating a structure in which the first and second dielectric layers of the multilayer capacitor in FIG. 1 are laminated.

Referring to FIGS. 1 to 4, a multilayer capacitor according to the embodiment may include a capacitor body 110 and first and second external electrodes 131 and 132.

The capacitor body 110 may be formed by laminating a plurality of first and second dielectric layers 111 and 112 in the Z direction and sintering the laminated first and second dielectric layers 111 and 112. A boundary between adjacent first and second dielectric layers 111 and 112 of the capacitor body 110 may be integrated such that boundaries therebetween are not readily apparent without the use of a scanning electron microscope (SEM).

The capacitor body 110 may be substantially hexahedral, but a shape of the capacitor body 110 is not limited thereto. The shape, the dimensions of the capacitor body 110, and the number of laminated layers of the dielectric layer 111 are not limited to those illustrated in the drawings of this embodiment.

In this embodiment, for ease of description, two surfaces of the capacitor body 110 opposing each other in the Z direction are defined as first and second surfaces 1 and 2, two surfaces of the capacitor body 110 connected to the first and second surfaces 1 and 2 and opposing each other in the X direction are defined as third and fourth surfaces 3 and 4, and two surfaces of the capacitor body 110 connected to the first and second surfaces 1 and 2 as well as to the third and fourth surfaces 3 and 4 and opposing each other in the Y direction are defined as fifth and sixth surfaces 5 and 6.

The first and second dielectric layers 111 and 112 may include a ceramic material having a high dielectric constant, for example, barium titanate ($BaTiO_3$)-based or strontium titanate ($SrTiO_3$)-based ceramic powder particles, or the like, but the ceramic material is not limited thereto. For example, any ceramic material may be used as long as sufficient capacitance may be obtained therefrom.

In addition, a ceramic additive, an organic solvent, a plasticizer, a binder, a dispersant, and the like, may be further added to the first and second dielectric layer 111 and 112, together with the ceramic powder particles.

The ceramic additive may be, for example, a transition metal oxide or a transition metal carbide, a rare earth element, magnesium (Mg), aluminum (Al), or the like.

The capacitor body 110 may include an active region as a portion contributing to capacitance formation of a capacitor, and upper and lower cover regions 113, respectively formed above and below the active region in the Z direction as upper and lower margin portions.

The upper and lower cover regions may have the same material and configuration as the first and second dielectric layer 111 and 112, except for not including internal electrodes.

The upper and lower cover regions 113 may be formed by laminating a single dielectric layer or two or more dielectric layers on upper and lower surfaces of the active region in the Z direction, respectively, and may basically serve to prevent damage, caused by physical or chemical stress, to the internal electrodes 121 and 122.

The capacitor body 110 includes a plurality of first internal electrodes and a plurality of second internal electrodes.

The first and second internal electrodes receive opposite polarities to each other and are respectively formed on one surface of the first dielectric layer 111 and one surface of the second dielectric layer 112. One of the first internal electrode is exposed through the third surface 3 of the capacitor body 110 to be connected to the first external electrode 131, and one end of the second internal electrode is exposed through the fourth surface 4 of the capacitor body 100 to be connected to the second external electrode 132.

According to the above configuration, charges are accumulated between the first and second internal electrodes when a predetermined voltage is applied to the first and second external electrodes 131 and 132.

In this case, the capacitance of the multilayer capacitor 100 is proportional to an area of overlap of the first and second internal electrodes 121 and 122 overlapping each other in the Z direction in the active region.

The material for forming the first and second internal electrodes 121 and 122 is not particularly limited. For example, precious metal materials such as platinum (Pt), palladium (Pd), palladium-silver (Pd—Ag) alloys or the like, and a conductive paste formed of at least one of nickel (Ni) and copper (Cu) may be used.

In this case, a method of printing the conductive paste may be a screen-printing method, a gravure printing method, or the like, but is not limited thereto.

The first and second external electrodes 131 and 141 may be provided with voltages having opposite polarities to each other, and may be disposed on both end portions of the capacitor body 110 in the X direction. The first and second external electrodes 131 and 141 may be connected to exposed portions of the first and second internal electrodes 121 and 122 to be electrically connected thereto, respectively.

In this case, the first and second external electrodes 131 and 132 may further include plating layers, respectively formed to cover surfaces of the first and second external electrodes 131 and 132.

The first external electrode 131 is disposed on the third surface 3 of the capacitor body 110.

The first external electrode 131 may include a first connection portion 131a and a first band portion 131b.

The first connection portion 131a is formed on the third surface of the body 110 to be connected to the exposed portion of the first internal electrode.

The first band portion 131b extends from the first connection portion 131a to a portion of each of the first, second, fifth, and sixth surfaces 1, 2, 5, and 6 of the capacitor body 110.

The second external electrode 132 is disposed on the fourth surface 4 of the capacitor body 110.

The second external electrode 132 may include a second connection portion 132a and a second band portion 132b.

The second connection portion 132a is formed on the fourth surface 4 of the capacitor body 110 to be connected to the exposed portion of the second internal electrode.

The second band portion 132b extends from the second connection portion 132a to a portion of each of the first, second, fifth, and sixth surfaces 1, 2, 5, and 6 of the capacitor body 110.

In the present disclosure, two or more internal electrodes are disposed in each of the first and second dielectric layers 111 and 112. In this case, the first and second internal electrodes are disposed in the first dielectric layer 111 to be spaced apart from each other and are also disposed in the second dielectric layer 112 to be spaced apart from each other.

For example, the first and second internal electrodes are disposed in a first dielectric layer 111 to be spaced apart from each other, and the first and second internal electrodes are disposed in a second dielectric layer 112 to be spaced apart from each other. In the capacitor body 110, the first and second dielectric layers 111 and 112 may be alternately laminated in the Z direction such that the first internal electrode of the first dielectric layer 111 and the second internal electrode of the second dielectric layer 112 overlap each other in the Z direction and the second internal electrode of the first dielectric layer 111 and the first internal electrode of the second dielectric layer 112 overlap each other in the Z direction.

In addition, the first internal electrode formed in the first dielectric layer 111 and the first internal electrode formed in the second dielectric layer 112 may be symmetrical with each other in the Y direction.

In addition, the second internal electrode formed in the first dielectric layer 111 and the second internal electrode formed in the second dielectric layer 112 may be symmetrical with each other in the Y direction.

In this embodiment, the first internal electrode may include a 1-1-th internal electrode 121 and a 1-2-th internal electrode 123.

The 1-1-th internal electrode 121 is disposed in the first dielectric layer 111 to be exposed toward the third surface 3 of the capacitor body 110.

The 1-2-th internal electrode 123 is disposed in the second dielectric layer 112 to be exposed toward the third surface 3 of the capacitor body 110 and to not overlap the 1-1-th internal electrode 121 in the Z direction.

For example, in the first dielectric layer 111, the 1-1-th internal electrode 121 is formed to be offset to the right in the Y direction on the drawing and the 1-2-th internal electrode 123 is formed to be offset to the left in the Y direction on the drawing. Accordingly, when the first and second dielectric layers 111 and 112 are laminated in the Z direction to constitute the capacitance body 110, the 1-1-th internal electrode 121 and the 1-2-th internal electrode 123 do not overlap each other in the Z direction.

The second internal electrode may include a 2-1-th internal electrode 122 and a 2-2-th internal electrode 124.

The 2-1-th internal electrode 122 is disposed in the first dielectric layer 111 to be spaced apart from the 1-1-th internal electrode 121 in the Y direction and to be exposed toward the fourth surface 4 of the capacitor body 110.

The 2-2-th internal electrode 124 is disposed in the second dielectric layer 112 in the Y direction to be spaced apart from the first second internal electrode 123, to be exposed through the fourth surface 4 of the capacitor body 110, and to not overlap the 2-1-th internal electrode 122 in the Z direction.

For example, in the first dielectric layer 111, the 2-1-th internal electrode 122 is formed to be offset to the left in the Y direction on the drawing, and the 2-2-th internal electrode 124 is formed to be offset to the right in the Y direction on the drawing. Accordingly, when the first and second dielectric layers 111 and 112 are laminated in the Z direction to constitute the capacitor body 110, the 2-1-th internal electrode 122 and the 2-2-th internal electrode 124 do not overlap each other in the Z direction.

In the above-configured multilayer capacitor 100, the first and second internal electrodes overlap each other in the Z direction as well as in the Y direction, and an effective area of an internal electrode involved in forming capacitance of the multilayer capacitor 100 may be significantly increased. Thus, the capacitance of the multilayer capacitor 100 may be significantly increased.

According to this embodiment, the effective area of the internal electrode may be increased by about 68%, as compared with an effective area of a multilayer capacitor according to the related art.

In a conductor through which current flows, a magnetic field is generated according to a path of the current to inevitably form an inductance element in a direction in which the flow of the current is suppressed. In a multilayer capacitor according to the related art, first and second internal electrodes are vertically disposed to form a single current path.

Meanwhile, according to this embodiment, the number of current paths of a multilayer capacitor is increased and directions of the currents are opposite to each other, so that directions of magnetic fields may offset each other to reduce an inductance element. Thus, ESL and ESR of the multilayer capacitor may be decreased.

As a result, the multilayer capacitor of this application may be effectively applied to various applications required to have low ESL, such as application processors (APs), smartphones, laptop computers, tablet personal computers (PCs), electronic components, and the like.

Figure 5A:
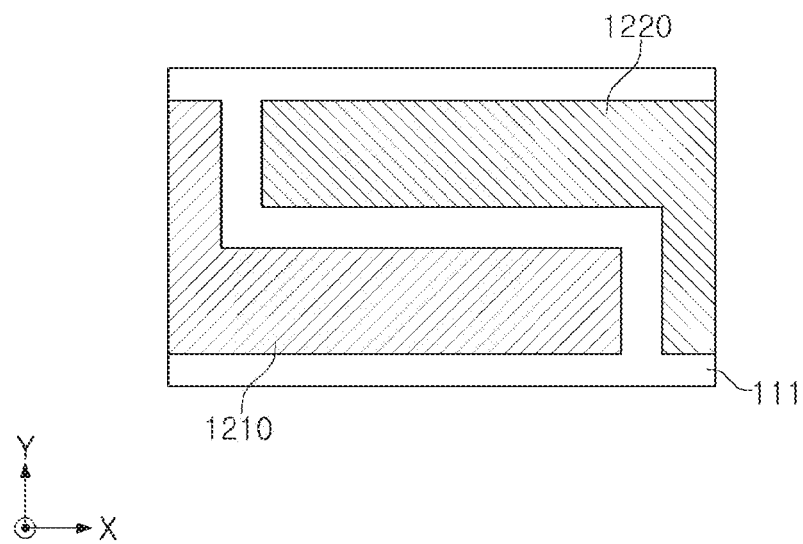
FIGS. 5A and 5B are plan views illustrating a modified example of the first and second internal electrodes in FIG. 2.
Figure 5B:
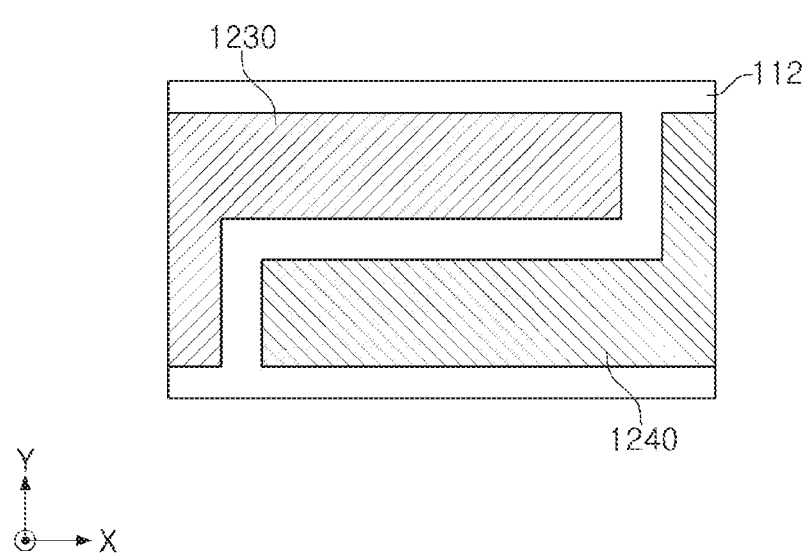

FIGS. 5A and 5B are plan views illustrating a modified example of the first and second internal electrodes in FIG. 2.

Figure 6:
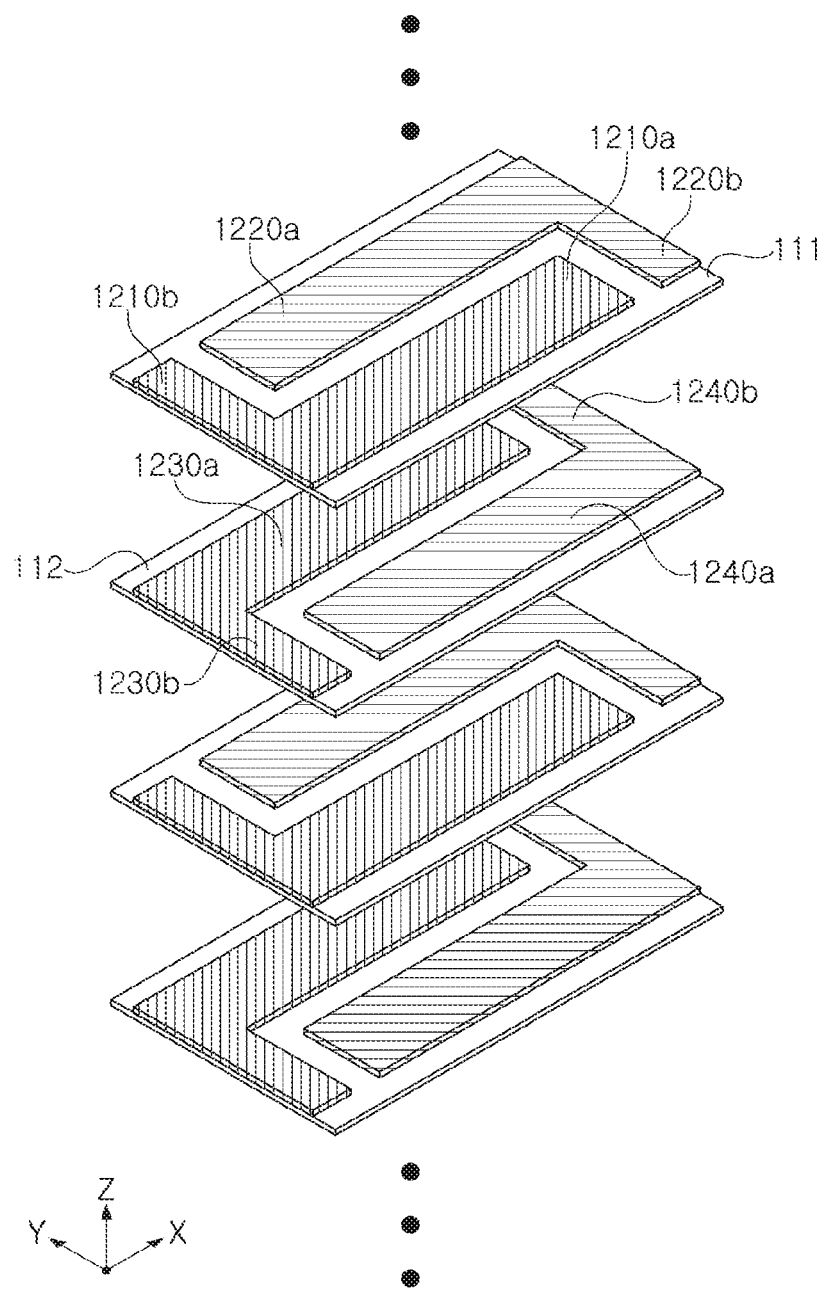
FIG. 6 is an exploded perspective view illustrating a structure in which the first and second dielectric layers of the multilayer capacitor in FIG. 1 are laminated.

FIG. 6 is an exploded perspective view illustrating a structure in which the first and second dielectric layers of the multilayer capacitor in FIG. 1 are laminated.

Referring to FIGS. 5A to 6, a first internal electrode according to this embodiment may include a first capacitance formation portion and a first lead portion.

The first lead portion may extend from the first capacitance formation portion to be exposed through a third surface 3 of a capacitor body 110, and may be wider than the first capacitance formation portion in a Y direction.

More specifically, a 1-1-th internal electrode 1210 according to this embodiment may include a 1-1-th first capacitance formation portion 1210a and a 1-1-th lead portion 1210b.

The 1-1-th lead portion 1210b may extend from the 1-1-th capacitance formation portion 1210a to be exposed through the third surface 3 of the capacitor body 110 and the 1-1-th capacitor portion 1210a, may extend from an end portion of the 1-1-th capacitance formation portion 1210a in the Y direction, and may be formed to be wider than the 1-1-th capacitance formation portion 1210a in the Y direction.

The 1-2-th internal electrode 1230 may include a 1-2-th capacitance formation portion 1230a and a 1-2-th lead portion 1230b.

The 1-2-th lead portion 1230b may extend from the 1-2-th capacitance formation portion 1230a to be exposed through the third surface 3 of the capacitor body 110, may extend from an end portion of the 1-2-th capacitance formation portion 1230a to the right in the Y direction, and may be formed to be wider than the 1-2-th capacitance formation portion 1230a in the Y direction.

The second internal electrode may include a second capacitance formation portion and a second lead portion.

The first capacitance formation portion overlaps the first capacitance formation portion in the Z direction.

The second lead portion may extend from the second capacitance formation portion to be exposed through the fourth surface 4 of the capacitor body 110, and may be wider than the second capacitance formation portion in the Y direction.

More specifically, the second-first internal electrode 1220 according to this embodiment may include a 2-1-th capacitor portion 1220a and the 2-1-th lead portion 1220b.

The 2-1-th lead portion 1220b extends from the 2-1-th capacitance formation portion 1220a to be exposed through the fourth surface 4 of the capacitor body 110, may extend from an end portion of the 2-1-th capacitance formation portion 1220a to the right in the Y direction, and may be formed to be wider than the 2-1-th capacitance formation portion 1220a in the Y direction.

A 2-2-th internal electrode 1240 may include a 2-2-th capacitance formation portion 1240a and a 2-2-th lead portion 1240b.

The 2-2-th lead portion 1240b extends from the 2-2-th capacitance formation portion 1240a to be exposed through the fourth surface 4 of the capacitor body 110, may extend from an end portion of the 2-2 capacitance formation portion 1240a to the left in the Y direction from the end, and may be formed to be wider than the capacitance formation portion 1240a in the Y direction than the 2-2.

Figure 7A:
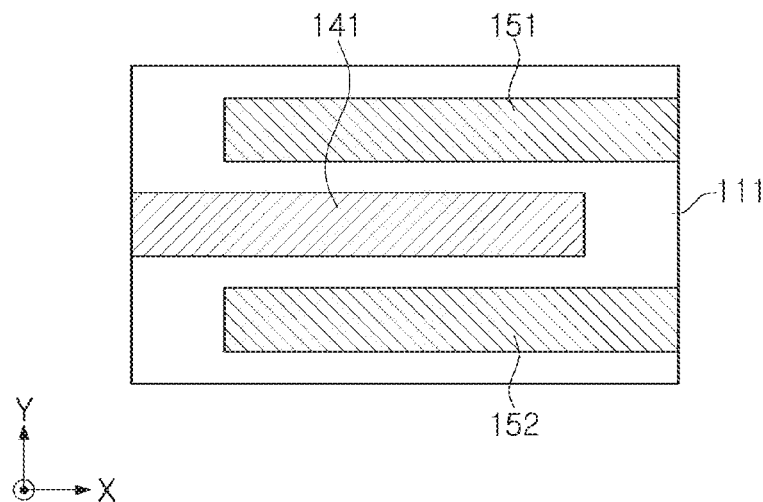
FIGS. 7A and 7B are plan views illustrating another example of first and second internal electrodes of a multilayer capacitor according to the present disclosure.
Figure 7B:
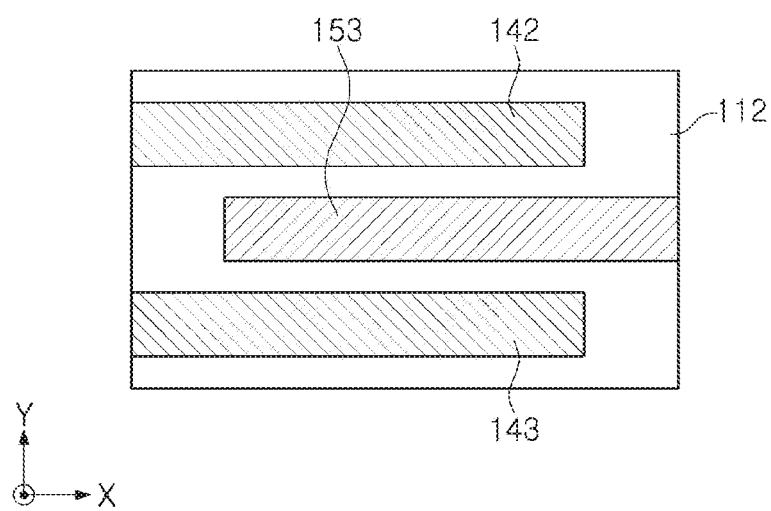

FIGS. 7A and 7B are plan views illustrating another example of first and second internal electrodes of a multilayer capacitor according to the present disclosure.

Referring to FIGS. 7A and 7B, a multilayer capacitor according to this embodiment may include a first internal electrode including a 1-1-th internal electrode 141 and a plurality of 1-2-th internal electrodes 142 and 143.

The 1-1-th internal electrode 141 is disposed in a first dielectric layer 111 to be exposed toward the third surface 3 of a capacitor body 110.

The plurality of 1-2-th internal electrodes 142 and 143 are disposed in a second dielectric layer 112 to be exposed toward the third surface 3 of the capacitor body 110, and may be disposed so as to not overlap the 1-1-th internal electrode 141 in a Z direction.

For example, the 1-1-th internal electrode 141 is formed in the center in the first dielectric layer 111 in a Y direction on the drawing, and two 1-2-th internal electrodes 142 and 143 are respectively formed to be offset to the right and left in the Y direction in the second dielectric layer 112 on the drawings. Accordingly, when the first and second dielectric layers 111 and 112 are laminated in the Z direction to constitute a capacitor body 110, the first 1-1-th internal electrode 121 and the two 1-2-th internal electrodes 142 and 143 do not overlap each other in a Z direction.

A second internal electrode may include a plurality of 2-1-th internal electrodes 151 and 152 and a 2-2-th internal electrode 153.

The plurality of 2-1-th internal electrodes 151 and 152 are disposed in the first dielectric layer 111 to be spaced apart from the 1-1-th internal electrode 141 in the Y direction, and are exposed toward the fourth surface 4 of the capacitor body 110.

The 2-2-th internal electrode 153 is exposed in the second dielectric layer 112 on the second dielectric layer 112 toward the fourth surface 4 of the capacitor body 110, and is disposed so as to not overlap the 2-1-th internal electrodes 151 and 152 the Z direction.

For example, the 2-2-th internal electrode 153 is formed in the center in the Y direction in the second dielectric layer 112 on the drawing, and the two 2-1-th internal electrodes 151 and 152 are respectively formed to be offset to the right and left in the Y direction in the first dielectric layer 111 on the drawing. Accordingly, when the first and second dielectric layers 111 and 112 are laminated in the Z direction to constitute the capacitor body 110, the plurality of 2-1-th internal electrodes 151 and 152 and the 2-2-th internal electrode 153 do not overlap each other in the Z direction.

Figure 8A:
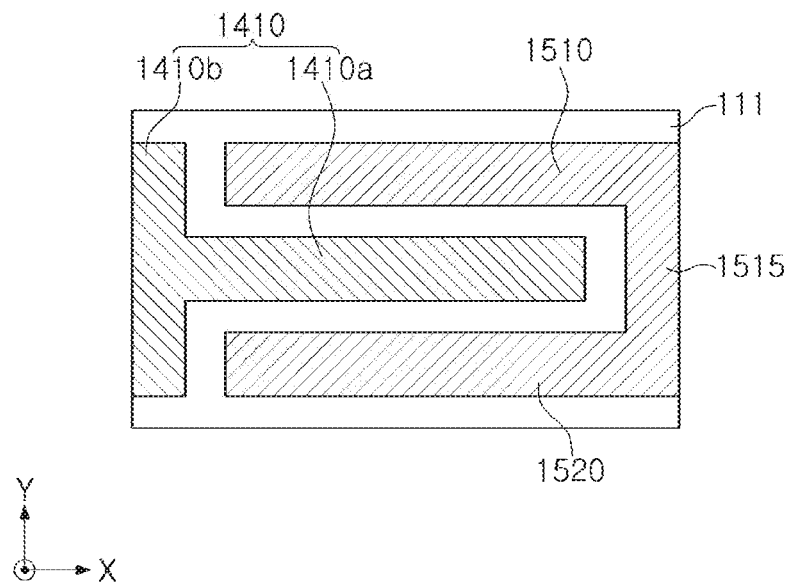
FIGS. 8A and 8B are plan views illustrating a modified example of the first and second internal electrodes in FIGS. 7A and 7B.
Figure 8B:
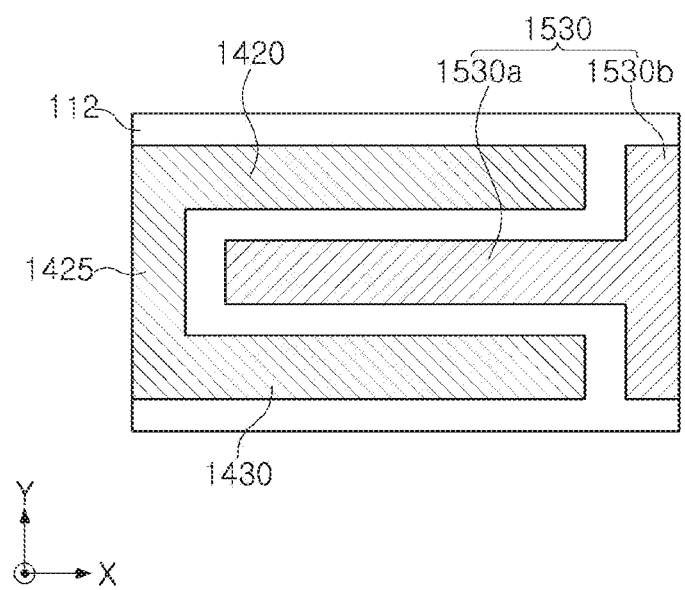

FIGS. 8A and 8B are plan views illustrating a modified example of the first and second internal electrodes in FIGS. 7A and 7B.

Referring to FIGS. 8A and 8B, a 1-1-th internal electrode 1410 according to this embodiment may include a 1-1-th capacitance formation portion 1410a and a 1-1-th lead portion 1410b.

The 1-1-th lead portion 1410b may extend from the 1-1-th capacitance formation portion 1410a to be exposed through a third surface 3 of a capacitor body 110, may extend from an end portion of the 1-1-th capacitance formation portion 1410a to the left and right in a Y direction, and may be formed to be wider than the 1-1-th capacitance formation portion 1410a in the Y direction.

The 1-2-th internal electrode may include a plurality of 1-2-th capacitance formation portions 1420 and 1430 and a 1-2-th lead portion 1425.

The 1-2-th lead portion 1425 connects end portions of the plurality of 1-2-th capacitance formation portions 1420 and 1430, and is exposed through the third surface 3 of the capacitor body 110.

The 2-1-th internal electrode includes a plurality of 2-1-th capacitance formation portions 1510 and 1520, overlapping the plurality of 1-2-th capacitance formation portions 1420 and 1430 in the Z direction, and a 2-1-th lead portion 1515.

The 2-1-th lead portion 1515 connects end portions of the plurality of 2-1-th capacitance formation portions 1510 and 1520 and is exposed through a fourth surface 4 of the capacitor body 110.

A 2-2-th internal electrode 1530 includes a 2-2-th capacitance formation portion 1530a, overlapping the 1-1-th capacitance formation portion 1410a in the Z direction, and a 2-2-th capacitance formation portion 1530b. The 2-2-th capacitance formation portion 1530b may extend from the 2-2-th capacitance formation portion 1530a to be exposed through the fourth surface 4 of the capacitor body 110, may extend from an end portion of the 2-2-th capacitance formation portion 1530a to the left and right in the Y direction, and may be formed to be wider than the 2-2-th capacitance formation portion 1530a in the Y direction.

According to another embodiment, the first internal electrode may include a plurality of 1-1-th internal electrodes, disposed in the first dielectric layer to be exposed toward a third surface of the capacitor body, and a plurality of 1-2-th internal electrodes disposed in the second dielectric layer to be exposed toward the third surface of the capacitor body and to not overlap the plurality of 1-1-th internal electrodes in a first direction.

The second internal electrode may include a plurality of 2-1-th internal electrodes, disposed in the first dielectric layers to be spaced apart from the 1-1-th internal electrode in a second direction and to be exposed toward the fourth surface of the capacitor body, and a plurality of 2-2-th internal electrodes disposed in the second dielectric layer to be exposed toward the fourth surface of the capacitor body and to not overlap the plurality of 2-1-th internal electrodes in the first direction.

According to another embodiment, since the number of current paths of a multilayer capacitor may be increased to greater than that in the above-described embodiment, directions of magnetic fields may offset each other to further improve an effect of reducing an inductance element. Thus, ESL and ESR of the multilayer capacitor may be decreased.

Hereinafter, such embodiments will be described in detail with reference to accompanying drawings. However, the present disclosure is not limited to embodiments described below.

Figure 9A:
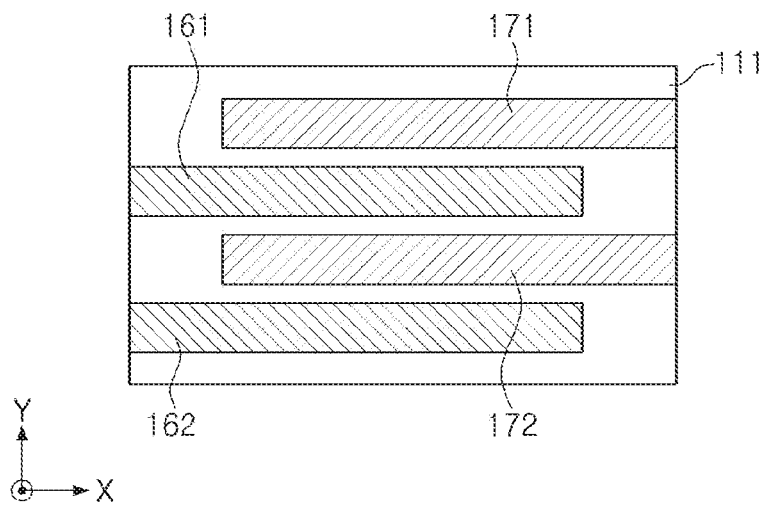
FIGS. 9A and 9B are plan views illustrating another example of first and second internal electrodes of a multilayer capacitor according to the present disclosure.
Figure 9B:
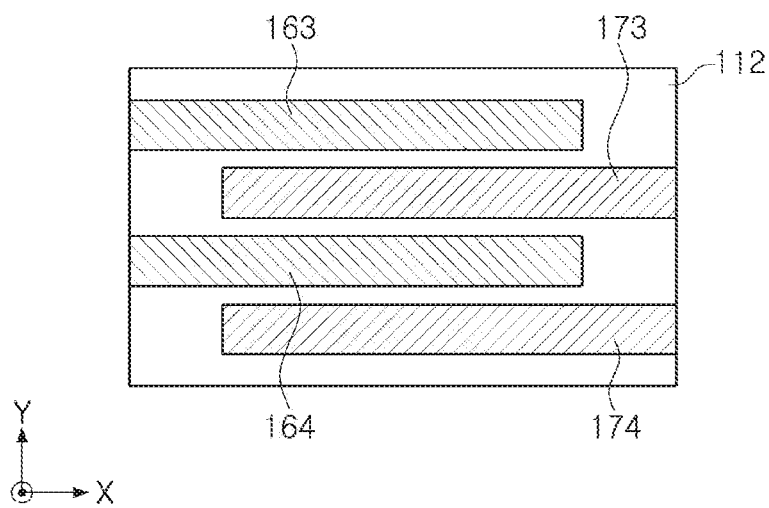

FIGS. 9A and 9B are plan views illustrating another example of first and second internal electrodes of a multilayer capacitor according to the present disclosure.

Referring to FIGS. 9A and 9B, a first internal electrode may include two 1-1-th internal electrodes 161 and 162, disposed in a first dielectric layer 111 to be spaced apart from each other in a Y direction, and two 1-2-th internal electrodes 163 and 164 disposed in a second dielectric layer 112 to be spaced apart from each other in the Y direction.

Each of the 1-1-th internal electrodes 161 and 162 has an end portion exposed through a third surface 3 of a capacitor body 110, and each of the 1-2-th internal electrode 163 and 164 has an end portion exposed through the third surface 3 of the capacitor body 110.

The two 1-2-th internal electrodes 163 and 164 are disposed on the second dielectric layer 112 at a predetermined interval so as to not overlap the two 1-1-th internal electrodes 161 and 162 in a Z direction when the first and second dielectric layers 111 and 112 are laminated in the Z direction to constitute the capacitor body 110.

A second internal electrode may include two 2-1-th internal electrodes 171 and 172, disposed in the first dielectric layer 111 to be spaced apart from each other in the Y direction, and two 2-2-th internal electrodes 173 and 174 disposed in the second dielectric layer 112 to be spaced apart from each other in the Y direction.

Each of the two 2-1-th internal electrodes 171 and 172 has an end portion exposed through a fourth surface 4 of the capacitor body 110, and each of the two 2-2-th internal electrodes 173 and 172 has an end portion exposed through the fourth surface 4 of the capacitor body 110.

The two 2-2-th internal electrodes 173 and 174 are disposed on the second dielectric layer 112 at a predetermined interval so as to not overlap the two 2-1 internal electrodes 171 and 172 in the Z direction when the first and second dielectric layers 111 and 112 are laminated in the Z direction to constitute the capacitor body 110.

Figure 10A:
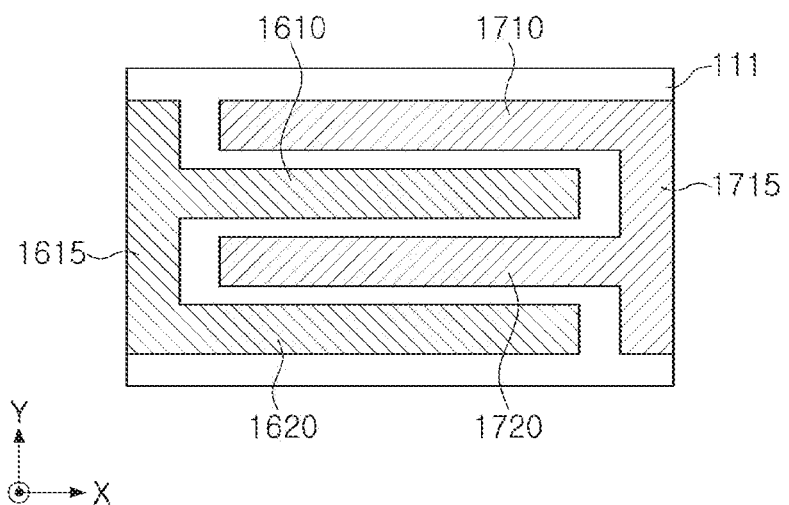
FIGS. 10A and 10B are plan views illustrating a modified example of the first and second internal electrodes in FIGS. 9A and 9B.
Figure 10B:
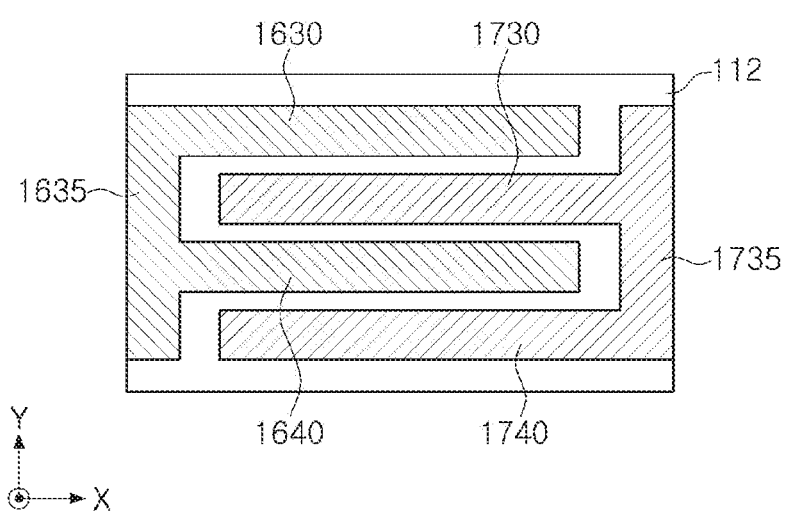

FIGS. 10A and 10B are plan views illustrating a modified example of the first and second internal electrodes in FIGS. 9A and 9B.

Referring to FIGS. 10A and 10B, a 1-1-th internal electrode may include two 1-1-th capacitance formation portions 1610 and 1620 and a 1-1-th lead portion 1615 connecting end portions of the two 1-1-th capacitance formation portions 1610 and 1620 and exposed through a third surface 3 of a capacitor body 110.

A 1-2-th internal electrode may include two 1-2-th capacitance formation portions 1630 and 1640 and a 1-2-th lead portion 1635 connecting end portion of the two 2-1-th capacitance formation portions 1630 and 1640 and exposed through the third surface 3 of the capacitor body 110.

A 2-1-th internal electrode may include two 2-1-th capacitance formation portions 1710 and 1720, overlapping the two 1-2-th capacitance formation portions 1630 and 1640, and a 2-1-th lead portion 1715 connecting end portions of the two 2-1-th capacitance formation portions 1710 and 1720 and exposed through the fourth surface 4 of the capacitor body 110.

A 2-2-th internal electrode may include two 2-2-th capacitance formation portions 1730 and 1740, overlapping the two 1-1-th capacitance formation portions 1610 and 1620, and a 2-2-th lead portion 1735 connecting end portions of the two 2-2-th capacitance formation portions 1730 and 1740 and exposed through the fourth surface 4 of the capacitor body 110.

Figure 11A:
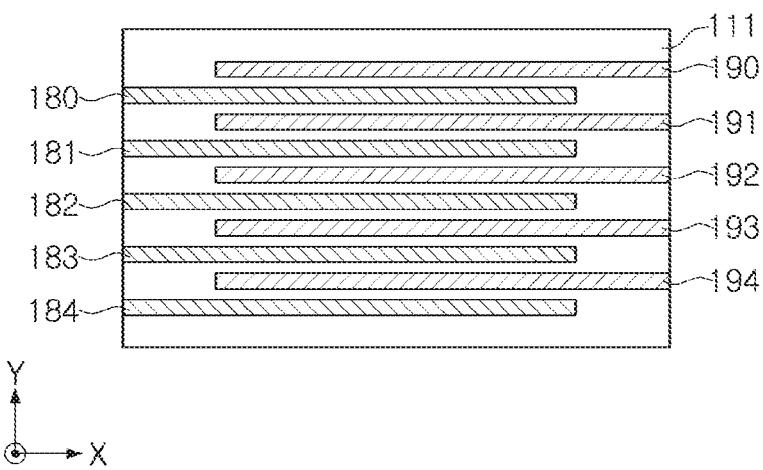
FIGS. 11A and 11B are plan views illustrating another example of first and second internal electrodes of a multilayer capacitor according to the present disclosure.
Figure 11B:
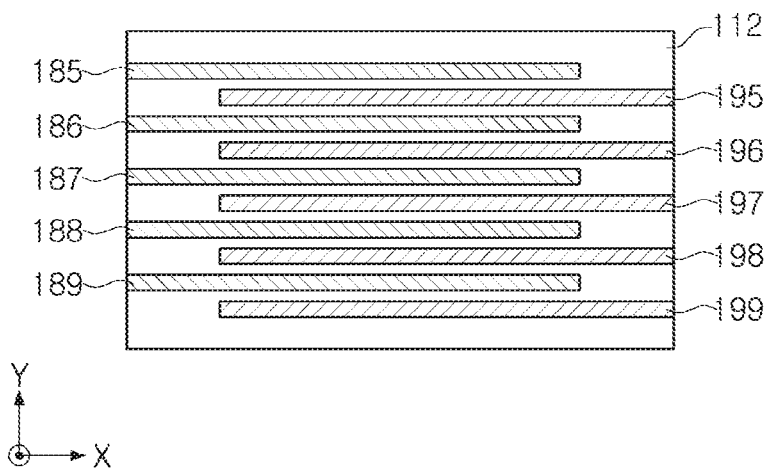

FIGS. 11A and 11B are plan views illustrating another example of first and second internal electrodes of a multilayer capacitor according to the present disclosure.

Referring to FIGS. 11A and 11B, a first internal electrode may include five 1-1-th internal electrodes 180 to 184, disposed in a first dielectric layer 111 to be spaced apart from each other in a Y direction, and five 1-2-th internal electrodes 185 and 189 disposed in a second dielectric layer 112 to be spaced apart from each other in the Y direction.

Each of the five 1-1-th internal electrodes 180 to 184 has an end portion exposed through a third surface 3 of a capacitor body 110, and each of the five 1-2-th internal electrodes 185 to 189 has an end portion exposed through the third surface 3 of the capacitor body 110.

The two 1-1-th internal electrodes 180 to 184 are disposed on the second dielectric layer 112 at a predetermined interval so as to not overlap the two 1-1-th internal electrodes 180 to 184 in the Z direction when the first and second dielectric layers 111 and 112 are laminated in a Z direction to constitute the capacitor body 110.

A second internal electrode may include five 2-1-th internal electrodes 190 to 194, disposed in the first dielectric layer 111 to be spaced apart from each other in the Y direction, and five 2-2-th internal electrodes 195 to 199 disposed in the second dielectric layer 112 to be spaced apart from each other in the Y direction.

Each of the five 2-1-th internal electrodes 190 to 194 has an end portion exposed through a fourth surface 4 of a capacitor body 110, and each of the five 2-2-th internal electrodes 195 to 199 has an end portion exposed through the fourth surface 4 of the capacitor body 110.

The five 2-2-th internal electrodes 195 to 199 are disposed on the second dielectric layer 112 at a predetermined interval so as to not overlap the two 2-1-th internal electrodes in the Z direction when the first and second dielectric layers 111 and 112 are laminated in the Z direction to constitute the capacitor body 110.

Table 1 shows a comparison between electrical characteristics after manufacturing a multilayer capacitor, including an internal electrode having a single-layer structure according to the related art, and the multilayer capacitor illustrated in FIGS. 11A and 11B.

TABLE 1

|  | Related-art Structure (1-Layer) | Embodiment (1-Layer) | Rate of Change [%] |
|---|---|---|---|
| Cp[pF] | 162.2 | 420.1 | 159% |
| ESL[µH] | 1.948 | 0.197 | −90% |
| ESR[mΩ] | 120097.2 | 46515.4 | −61% |

As can be seen from Table 1, in the case of this embodiment, ESL and ESR are significantly decreased while capacitance is significantly increased to 159%.

Figure 12A:
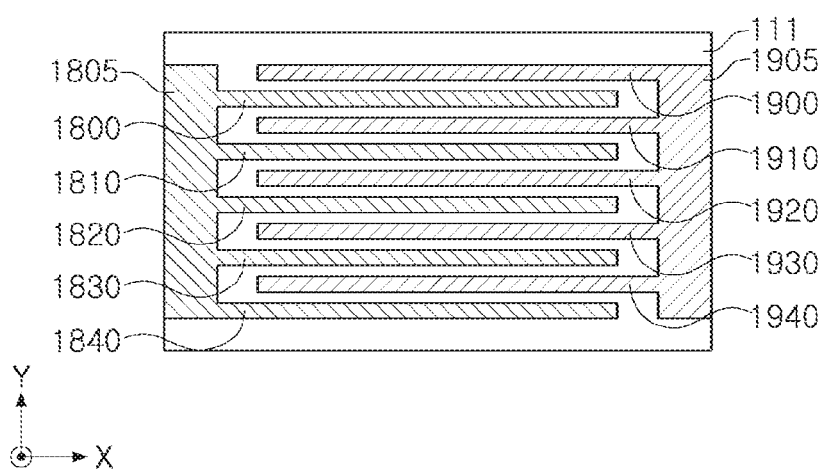
FIGS. 12A and 12B are plan views illustrating a modified example of the first and second internal electrodes in FIGS. 11A and 11B.
Figure 12B:
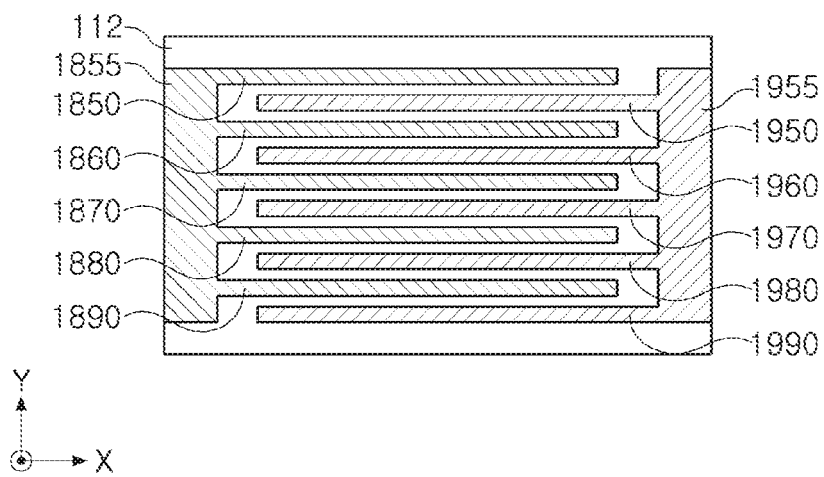

FIGS. 12A and 12B are plan views illustrating a modified example of the first and second internal electrodes in FIGS. 11A and 11B.

Referring to FIGS. 12A and 12B, a 1-1-th internal electrode may include five 1-1-th capacitance formation portions 1800, 1810, 1820, 1830, and 1840 and a 1-1-th lead portion 1805 connecting end portions of five 1-1-th capacitance formation portions 1800, 1810, 1820, 1830, and 1840 to each other and exposed through a third surface 3 of a capacitor body 110.

A 1-2-th internal electrode may include five 1-2-th capacitance formation portions 1850, 1860, 1870, 1880, and 1890 and a 1-2-th lead portion connecting end portions of the five 2-1-th capacitance formation portions 1850, 1860, 1870, 1880, and 1890 to each other and exposed through the third surface 3 of the capacitor body 110.

A 2-1-th internal electrode may include five 2-1-th capacitance formation portions 1900, 1910, 1920, 1930, and 1940, overlapping the five 1-2-th capacitance formation portions 1850, 1860, 1870, 1880, and 1890 in a Z direction, and a 2-1-th lead portion 1905 connecting end portions of the five 1-1-th capacitance formation portions 1900, 1910, 1920, 1930, and 1940 and exposed through a fourth surface 4 of the capacitor body 110.

A 2-2-th internal electrode may include five 2-1-th capacitance formation portions 1950, 1960, 1970, 1980, and 1990, overlapping the five 1-1-th capacitors 1800, 1810, 1820, 1830, and 1840 in the Z direction, and a 2-2-th lead portion 1955 connecting end portions of the five 2-2-th capacitance formation portions 1950, 1960, 1970, 1980, and 1990 to each other and exposed through the fourth surface 4 of the capacitor body 110.

Figure 13:
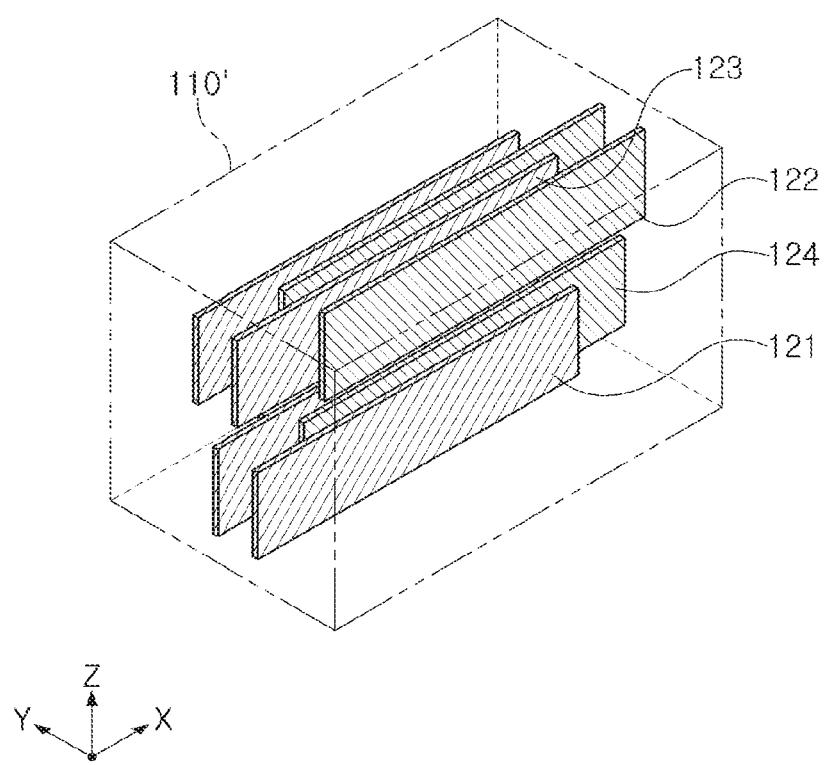
FIG. 13 is transparent perspective view illustrating a structure in which first and second dielectric layers of a multilayer capacitor according to another embodiment of the present disclosure are laminated.

FIG. 13 is transparent perspective view illustrating a structure in which first and second dielectric layers of a multilayer capacitor according to another embodiment of the present disclosure are laminated.

Features similar to those of the above-described embodiment will be omitted to avoid duplicate description, and descriptions will be given to focus on a different structure to the structures in the above-described embodiment.

Referring to FIG. 13, a multilayer capacitor according to this embodiment has a structure in which internal electrodes 121 to 124 are laminated to be vertical to a first surface of a capacitor body 110' to be a mounting surface.

The capacitor body 110' includes first and second dielectric layers having first and second surfaces opposing each other in a Z direction, third and fourth surfaces connected to the first and second surfaces and opposing each other in an X direction, and fifth and sixth surfaces connected to the first and second surfaces as well as to the third and fourth surfaces and opposing each other in a Y direction, the first and second dielectric layers being alternately laminated in the Y direction, a plurality of internal electrodes exposed through the third surface, and a plurality of second internal electrodes through the fourth surface.

In addition, first and second external electrodes 131 and 132 are disposed on the third and fourth surfaces 3 and 4 of the capacitor body 110'.

In this embodiment, two or more internal electrodes are disposed in each of the first and second dielectric layers 111 and 112. In this case, the first and second internal electrodes are disposed in the first dielectric layer 111 to be spaced apart from each other and are also disposed in the second dielectric layer to be spaced apart from each other.

For example, first and second internal electrodes may be disposed in one of the first dielectric layers 111 to be spaced apart from each other, and first and second internal electrodes may be disposed in one of the second dielectric layers 112 to be spaced apart from each other. In the capacitor body 110, the first and second dielectric layers 111 and 112 may be alternately laminated in the Y direction such that the first internal electrode of the first dielectric layer 111 and the second internal electrode of the second dielectric layer 112 overlap each other in the Y direction and the second internal electrode of the first dielectric layer 111 and the first internal electrode of the second dielectric layer 112 overlap each other in the Y direction.

In addition, the first internal electrode formed in the first dielectric layer 111 and the first internal electrode formed in the second dielectric layer 112 may be symmetrical with each other in the Z direction.

In addition, the second internal electrode formed in the first dielectric layer 111 and the second internal electrode formed in the second dielectric layer 112 may be symmetrical with each other in the Z direction.

Similarly to a multilayer capacitor having a horizontally laminated structure, such a multilayer capacitor having a vertically laminated structure may have an internal electrode structure appropriately modified and applied in various embodiments.

As necessary, a multilayer capacitor of this application may have a structure in which first and second connection portions of first and second external electrodes are disposed on fifth and sixth surfaces of a capacitor body and one end of a first internal electrode and one of a second internal electrode are respectively exposed through the fifth and sixth surface of a capacitor body.

As described above, according to embodiments, an effective area of an internal electrode may be controlled to reduce ESR and ESL while a multilayer capacitor has high capacitance.

While example embodiments have been shown and described above, it will be apparent to those skilled in the art that modifications and variations could be made without departing from the scope of the present disclosure as defined by the appended claims.

What is claimed is:

1. A multilayer capacitor comprising:
    a capacitor body including first and second dielectric layers, the capacitor body having first and second surfaces opposing each other, third and fourth surfaces connected to the first and second surfaces and opposing each other, and fifth and sixth surfaces connected to the first and second surfaces and to the third and fourth surfaces and opposing each other, a plurality of first internal electrodes exposed through the third surface, and a plurality of second internal electrodes exposed through the fourth surface; and
    first and second external electrodes, respectively disposed on the third and fourth surfaces of the capacitor body,
    wherein first and second internal electrodes are disposed in one of the first dielectric layers to be spaced apart from each other in a second direction perpendicular to a first direction, and first and second internal electrodes are disposed in one of the second dielectric layers to be spaced apart from each other in the second direction,
    the first and second dielectric layers are alternately laminated in the first direction such that the first internal electrode of the first dielectric layer and the second internal electrode of the second dielectric layer overlap each other in the first direction and the second internal electrode of the first dielectric layer and the first internal electrode of the second dielectric layer overlap each other in the first direction, and
    wherein at least one of the first or second internal electrodes disposed in the one of the first dielectric layers or in the one of the second dielectric layers is spaced apart from an edge of the one of the first dielectric layers or the one of the second dielectric layers, respectively, in the second direction.

2. The multilayer capacitor of claim 1, wherein the first internal electrode includes a 1-1-th internal electrode, disposed in the first dielectric layer to be exposed toward the third surface of the capacitor body, and a 1-2-th internal electrode disposed in the second internal electrode to be exposed toward the third surface of the capacitor body and to not overlap the 1-1-th internal electrode in the first direction, and
    the second internal electrode includes a 2-1-th internal electrode, disposed in the first dielectric layer to be spaced apart from the 1-1-th internal electrode in a second direction and to be exposed toward the fourth surface of the capacitor body, and a 2-2-th internal electrode disposed in the second dielectric layer to be spaced apart from the 1-2-th internal electrode in the second direction in which the fifth and sixth surface are connected to each other, to be exposed toward the fourth surface of the capacitor body, and to not overlap the 2-1-th internal electrode in the first direction.

3. The multilayer capacitor of clam 2, wherein the first internal electrode includes a first capacitance formation portion and a first lead portion extending from the first capacitance formation portion to be exposed through the third surface of the capacitor body and formed to be wider than the first capacitance formation portion in the second direction, and the second internal electrode includes a second capacitance formation portion, overlapping the first capacitance formation portion in the first direction, and a second lead portion extending from the second capacitance formation portion to be exposed through the fourth surface of the capacitor body and formed to be wider than the second capacitance formation portion in the second direction.

4. The multilayer capacitor of claim 1, wherein the first internal electrode includes a 1-1-th internal electrode, disposed in the first dielectric layer to be exposed through the third surface of the capacitor body, and a plurality of 1-2-th internal electrodes disposed in the second internal to be exposed through the third surface of the capacitor body and to not overlap the 1-1-th internal electrode in the first direction, and the second internal electrode includes a plurality of 2-1-th internal electrodes, disposed in the first dielectric layer to be spaced apart from the 1-1-th internal electrode in a second direction and to be exposed through the fourth surface of the capacitor body, and a 2-2-th internal electrode disposed in the second dielectric layer to be exposed through the fourth surface of the second dielectric layer and to not overlap the 2-1-th internal electrode in the first direction.

5. The multilayer capacitor of claim 4, wherein the 1-1-th internal electrode includes a 1-1-th capacitance formation portion and a 1-1-th lead portion extending from the 1-1-th capacitance formation portion to be exposed through the third surface of the capacitor body and formed to be wider than the 1-1-th capacitance formation portion in the second direction, the 1-2-th internal electrode includes a plurality of 1-2-th capacitance formation portions and a 1-2-th lead portion connecting end portions of the plurality of 2-1-th capacitance formation portions to each other and exposed through the third surface of the capacitor body, the 2-1-th internal electrode includes a plurality of 2-1-th capacitance formation portions, overlapping the plurality of 1-2-th capacitance formation portions in the first direction, and a 2-1th lead portion connecting end portions of the plurality of 2-1-th capacitance formation portions to each other and exposed through the fourth surface of the capacitor body, and the 2-2-th internal electrode includes a 2-2-th capacitance formation portion, overlapping the 1-1-th capacitance formation portion in the first direction, and a 2-2-th lead portion extending from the 2-2-th capacitance formation portion to be exposed through the fourth surface of the capacitor body and formed to be wider than the 2-2-th capacitance formation portion in the second direction.

6. The multilayer capacitor of claim 1, wherein the first internal electrode includes a plurality of 1-1-th internal electrodes, disposed in the first dielectric layer to be exposed through the third surface of the capacitor body, and a plurality of 1-2-th internal electrodes disposed in the second dielectric layer to be exposed through the third surface of the capacitor body and to not overlap the plurality of 1-1-th internal electrodes in the first direction, and the second internal electrode includes a plurality of 2-1-th internal electrodes, disposed in layer to be spaced apart from the 1-1-th internal electrode in a second direction and to be exposed through the fourth surface of the capacitor body, and a plurality of 2-2-th internal electrodes disposed in the second dielectric layer to be exposed through the fourth surface of the capacitor body and to not overlap the plurality of 2-1-th internal electrodes in the first direction.

7. The multilayer capacitor of claim 6, wherein the 1-1-th internal electrode includes a plurality of 1-1-th capacitance formation portions and a plurality of 1-1-th lead portions connecting end portions of the plurality of 1-1-th capacitance formation portions to each other and exposed through the third surface of the capacitor body, the 1-2-th internal electrode includes a plurality of 1-2-th capacitance formation portions and a 1-2-th lead portion connecting end portions of the plurality of 2-1-th capacitance formation portions to each other and exposed through the third surface of the capacitor body, the 2-1-th internal electrode includes a plurality of 2-1-th capacitance formation portions, overlapping the plurality of 1-2-th capacitance formation portions in the first direction, and a 2-1-th lead portion connecting end portions of the plurality of 2-1-th capacitance formation portions to each other and exposed through the fourth surface of the capacitor body, and the 2-2-th internal electrode includes a plurality of 2-2-th capacitance formation portions, overlapping the plurality of 1-1-th capacitance formation portions in the first direction, and a 2-2-th lead portion exposed through the fourth surface of the capacitor body.

8. The multilayer capacitor of claim 1, wherein the first external electrode includes a first connection portion, formed on the third surface of the capacitor body, and a first band portion extending from the first connection portion to a portion of each of the first, second, fifth, and sixth surfaces of the capacitor body, and the second external electrode includes a second connection portion, formed on the fourth surface of the capacitor body, and a second band portion extending from the second connection portion to a portion of each of the first, second, fifth, and sixth surfaces of the capacitor body.

9. A multilayer capacitor comprising:

a capacitor body including first and second dielectric layers, the body having first and second surfaces opposing each other, third and fourth surfaces connected to the first and second surfaces and opposing each other, and fifth and sixth surfaces connected to the first and second surfaces as well as to the third and fourth surfaces and opposing each other, a plurality of first internal electrodes exposed through the third surface, and a plurality of second internal electrodes exposed through the fourth surface; and first and second external electrodes, respectively disposed on the third and fourth surfaces of the capacitor body, wherein first and second internal electrodes are disposed in one of the first dielectric layers to be spaced apart from each other in a first direction perpendicular to a second direction, and first and second internal electrodes are disposed in one of the second dielectric layers to be spaced apart from each other in the first direction, the first and second dielectric layers are alternately laminated in the second direction such that the first internal electrode of the first dielectric layer and the second internal electrode of the second dielectric layer overlap each other in the second direction and the second internal electrode of the first dielectric layer and the first internal electrode of the second dielectric layer overlap each other in the second direction, and wherein at least one of the first or second internal electrodes disposed in the one of the first dielectric layers or in the one of the second dielectric layers is spaced apart from an edge of the one of the first dielectric layers or the one of the second dielectric layers, respectively, in the first direction.

10. The multilayer capacitor of claim 9, wherein the first internal electrode includes a 1-1-th internal electrode, disposed in the first dielectric layer to be exposed through the third surface of the capacitor body, and a 1-2-th internal electrode disposed in the second internal electrode to be exposed through the third surface of the capacitor body and to not overlap the 1-1-th internal electrode in the second direction, and the second internal electrode includes a 2-1-th internal electrode, disposed in the first dielectric layer to be spaced apart from the 1-1-th internal electrode in a first direction and to be exposed through the fourth surface of the capacitor body, and a 2-2-th internal electrode disposed in the second dielectric layer to be spaced apart from the 1-2-th internal electrode in the first direction, to be exposed through the fourth surface of the capacitor body, and to not overlap the 2-1-th internal electrode in the second direction.

11. The multilayer capacitor of clam 10, wherein the first internal electrode includes a first capacitance formation portion and a first lead portion extending from the first capacitance formation portion to be exposed through the third surface of the capacitor body and formed to be wider than the first capacitance formation portion in the first direction, and
the second internal electrode includes a second capacitance formation portion, overlapping the first capacitance formation portion in the second direction, and a second lead portion extending from the second capacitance formation portion to be exposed through the fourth surface of the capacitor body and formed to be wider than the second capacitance formation portion in the first direction.

12. The multilayer capacitor of claim 9, wherein the first internal electrode includes a 1-1-th internal electrode, disposed in the first dielectric layer to be exposed through the third surface of the capacitor body, and a plurality of 1-2-th internal electrodes disposed in the second internal to be exposed through the third surface of the capacitor body and to not overlap the 1-1-th internal electrode in the second direction, and
the second internal electrode includes a plurality of 2-1-th internal electrodes, disposed in the first dielectric layer to be spaced apart from the 1-1-th internal electrode in the second direction and to be exposed through the fourth surface of the capacitor body, and a 2-2-th internal electrode disposed in the second dielectric layer to be exposed through the fourth surface of the second dielectric layer and to not overlap the 2-1-th internal electrode in the second direction.

13. The multilayer capacitor of claim 12, wherein the 1-1-th internal electrode includes a 1-1-th capacitance formation portion and a 1-1-th lead portion extending from the 1-1-th capacitance formation portion to be exposed through the third surface of the capacitor body and formed to be wider than the 1-1-th capacitance formation portion in the first direction,
the 1-2-th internal electrode includes a plurality of 1-2-th capacitance formation portions and a 1-2-th lead portion connecting end portions of the plurality of 2-1-th capacitance formation portions to each other and exposed through the third surface of the capacitor body,
the 2-1-th internal electrode includes a plurality of 2-1-th capacitance formation portions, overlapping the plurality of 1-2-th capacitance formation portions in the second direction, and a 2-1-th lead portion connecting end portions of the plurality of 2-1-th capacitance formation portions to each other and exposed through the fourth surface of the capacitor body, and
the 2-2-th internal electrode includes a 2-2-th capacitance formation portion, overlapping the 1-1-th capacitance formation portion in the second direction, and a 2-2-th lead portion extending from the 2-2-th capacitance formation portion to be exposed through the fourth surface of the capacitor body and formed to be wider than the 2-2-th capacitance formation portion in the first direction.

14. The multilayer capacitor of claim 9, wherein the first internal electrode includes a plurality of 1-1-th internal electrodes, disposed in the first dielectric layer to be exposed through the third surface of the capacitor body, and a plurality of 1-2-th internal electrodes disposed in the second dielectric layer to be exposed through the third surface of the capacitor body and to not overlap the plurality of 1-1-th internal electrodes in the second direction, and
the second internal electrode includes a plurality of 2-1-th internal electrodes, disposed in the first dielectric layer to be spaced apart from the 1-1-th internal electrode in a first direction and to be exposed through the fourth surface of the capacitor body, and a plurality of 2-2-th internal electrodes disposed in the second dielectric layer to be exposed through the fourth surface of the capacitor body and to not overlap the plurality of 2-1-th internal electrodes in the second direction.

15. The multilayer capacitor of claim 14, wherein the 1-1-th internal electrode includes a plurality of 1-1-th capacitance formation portions and a plurality of 1-1-th lead portions connecting end portions of the plurality of 1-1-th capacitance formation portions to each other and exposed through the third surface of the capacitor body,
the 1-2-th internal electrode includes a plurality of 1-2-th capacitance formation portions and a 1-2-th lead portion connecting end portions of the plurality of 2-1-th capacitance formation portions to each other and exposed through the third surface of the capacitor body,
the 2-1-th internal electrode includes a plurality of 2-1-th capacitance formation portions, overlapping the plurality of 1-2-th capacitance formation portions in the second direction, and a 2-1-th lead portion connecting end portions of the plurality of 2-1-th capacitance formation portions to each other and exposed through the fourth surface of the capacitor body, and
the 2-2-th internal electrode includes a plurality of 2-2-th capacitance formation portions, overlapping the plurality of 1-1-th capacitance formation portions in the first direction, and a 2-2-th lead portion exposed through the fourth surface of the capacitor body.

16. The multilayer capacitor of claim 9, wherein the first external electrode includes a first connection portion, formed on the third surface of the capacitor body, and a first band portion extending from the first connection portion to a portion of each of the first, second, fifth, and sixth surfaces of the capacitor body, and
the second external electrode includes a second connection portion, formed on the fourth surface of the capacitor body, and a second band portion extending from the second connection portion to a portion of each of the first, second, fifth, and sixth surfaces of the capacitor body.

17. A multilayer capacitor comprising:
a capacitor body including first and second dielectric layers alternately laminated in a thickness direction;

first and second external electrodes disposed respectively on first and second side surfaces of the capacitor body opposing each other in a length direction;

a set of first and second internal electrodes spaced apart from each other in a width direction and disposed on each of the first dielectric layers, the first internal electrodes being exposed through the first side surface and contacting the first external electrode and the second internal electrodes being exposed through the second side surface and contacting the second external electrode;

a set of third and fourth internal electrodes spaced apart from each other in the width direction and disposed on each of the second dielectric layers, the third internal electrodes being exposed through the first side surface and contacting the first external electrode and the fourth internal electrodes being exposed through the second side surface and contacting the second external electrode, and wherein the first internal electrodes and the fourth internal electrodes overlap each other in the thickness direction without overlapping the third internal electrodes or the second internal electrodes, respectively, and the second internal electrodes and the third internal electrodes overlap each other in the thickness direction.

18. The multilayer capacitor of claim 17, wherein each set of the first and second internal electrodes, and each set of the third and fourth internal electrodes include interlacing comb-tooth structures.

19. The multilayer capacitor of claim 17, wherein a material of the first and second dielectric layers is the same.

20. The multilayer capacitor of claim 17, further comprising cover regions disposed above and below the topmost and bottommost of the first and second dielectric layers, the cover regions having a same material as that of the first and second dielectric layers.

21. The multilayer capacitor of claim 17, wherein the first and third internal electrodes do not overlap in the thickness direction, and the second and fourth internal electrodes do not overlap in the thickness direction.

* * * * *